US007043044B2

(12) United States Patent
Amid-Hozour

(10) Patent No.: US 7,043,044 B2
(45) Date of Patent: May 9, 2006

(54) PORTABLE AUDIO PLAYER

(75) Inventor: Esmail Amid-Hozour, Palo Alto, CA (US)

(73) Assignee: Eton Corporation, Palo Alto, CA (US)

( * ) Notice: Subject to any disclaimer, the term of this patent is extended or adjusted under 35 U.S.C. 154(b) by 0 days.

(21) Appl. No.: 10/505,069

(22) PCT Filed: Apr. 15, 2003

(86) PCT No.: PCT/US03/11612

§ 371 (c)(1),
(2), (4) Date: Aug. 13, 2004

(87) PCT Pub. No.: WO03/094575

PCT Pub. Date: Nov. 13, 2003

(65) Prior Publication Data

US 2005/0105754 A1    May 19, 2005

Related U.S. Application Data

(60) Provisional application No. 60/376,890, filed on Apr. 30, 2002.

(51) Int. Cl.
*H04R 25/00* (2006.01)
(52) U.S. Cl. .................. 381/388; 381/306; 381/333

(58) Field of Classification Search ................ 381/300, 381/301, 303–306, 333, 334, 335, 386, 388; 361/681, 682, 683, 686; 181/141, 144, 199; 348/836, 838
See application file for complete search history.

(56) References Cited

U.S. PATENT DOCUMENTS

| 5,668,882 | A | * | 9/1997 | Hickman et al. ........... 381/300 |
| 5,732,140 | A | * | 3/1998 | Thayer ...................... 381/300 |
| 6,040,978 | A | | 3/2000 | Spencer |
| 6,191,942 | B1 | | 2/2001 | Lee et al. |
| 6,600,827 | B1 | * | 7/2003 | Lu ............................. 381/388 |
| 6,671,171 | B1 | * | 12/2003 | Homer et al. ............... 361/683 |

* cited by examiner

*Primary Examiner*—Huyen Le
(74) *Attorney, Agent, or Firm*—Jackson Walker, L.L.P.

(57) ABSTRACT

The present invention provides an MP3 compatible, portable, digital audio player. The audio player (11) of the present invention has a base member (12) and a cover member (14) pivotably attached thereto. The cover member (14) of the present invention has a perforated portion (36) and at least one speaker receptacle (28) capable of releasably engaging one or more audio speakers. The audio speakers (30) of the present invention may be removed and positioned apart from the audio player such that the user may have an enjoyable listening experience without the need for conventional headphones.

1 Claim, 4 Drawing Sheets

PORTABLE AUDIO PLAYER

This patent application is based upon and claims priority from a provisional patent application entitled "Portable Audio Player", Ser. No. 60/376,890, having a filing date of Apr. 30, 2002.

FIELD OF THE INVENTION

The present invention relates generally to portable audio players and, more particularly, to a portable, MP3 compatible audio player having removable speakers.

BACKGROUND OF TIE INVENTION

Audio players and specifically, portable audio players, have evolved dramatically in the past 70 years. The first portable audio player was a miniaturized radio device, known as a radio transistor, which included a compact solid-state device including a semiconductor having three or more electrodes. Some years later, analog recording technology allowed input audio waves to be converted to analog audio waves, thus making cassette tapes utilizing magnetic tape the dominant design in the portable audio player industry.

In the late 1980's, compact discs and compact disc players became widely utilized to record and play audio information. Compact discs include digital audio information and are superior to analog audio tapes in terms of durability and quality.

The most recent development in portable audio players is the chip-based digital player. A digital audio player includes an audio chip and a storage device capable of recording, storing, and playing digital audio information. Typically, an audio chip is designed to compress and decompress audio digital data in order to save memory space. Digital audio players, such as MP3 players, have become feasible for the average consumer due to the co-evolution of miniaturized high-capacity digital storage devices and digital information compression techniques. Portable audio players capable of playing MP3 media typically resemble a conventional compact disc player. Specifically, known digital audio players typically require the use of headphones by the consumer. There remains a need for a digital audio player compatible with MP3 technology that provides the consumer with an enjoyable listening experience without the need for headphones.

SUMMARY OF THE INVENTION

Accordingly, the present invention provides an MP3 compatible, portable digital audio player having one or more speakers. The audio player of the present invention comprises a base member having a media receptor for receiving one or more compact discs containing audio information. A cover member capable of rotating about an axis of rotation is pivotably attached to the base member. The cover member of the present invention is equipped with one or more receptacles for receiving one or more audio speakers. In one embodiment, at least a portion of the cover member of the present invention is perforated such that sound may readily pass through the cover member. Thus, speakers may be placed within one or more speaker receptacles of the cover member such that the audio player of the present invention becomes a self-contained, portable, digital audio player.

The audio player of the present invention allows one or more speakers to be retained within the speaker receptacle or removed therefrom depending on the individual preference of the user. In one embodiment, the cover member of the present invention is equipped with two speaker receptacles. Thus, the user may remove each speaker from the cover member and position them apart from the audio player. This allows the user to experience "stereo sound" without the use of headphones.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
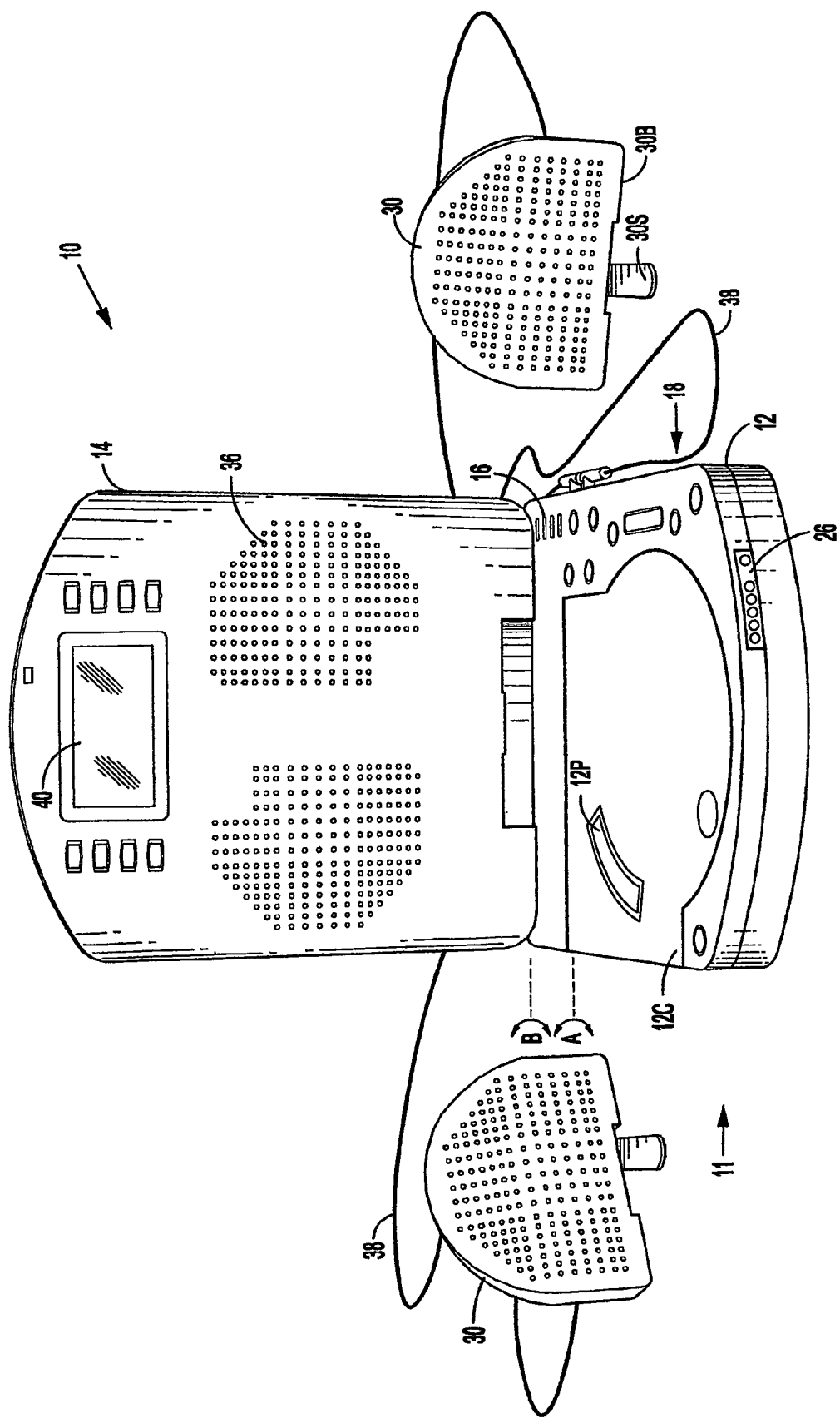
FIG. 1 is a front, perspective view of one embodiment of the present invention illustrating the cover member in an open position and two speakers positioned in "stand-alone" mode.
Figure 2:
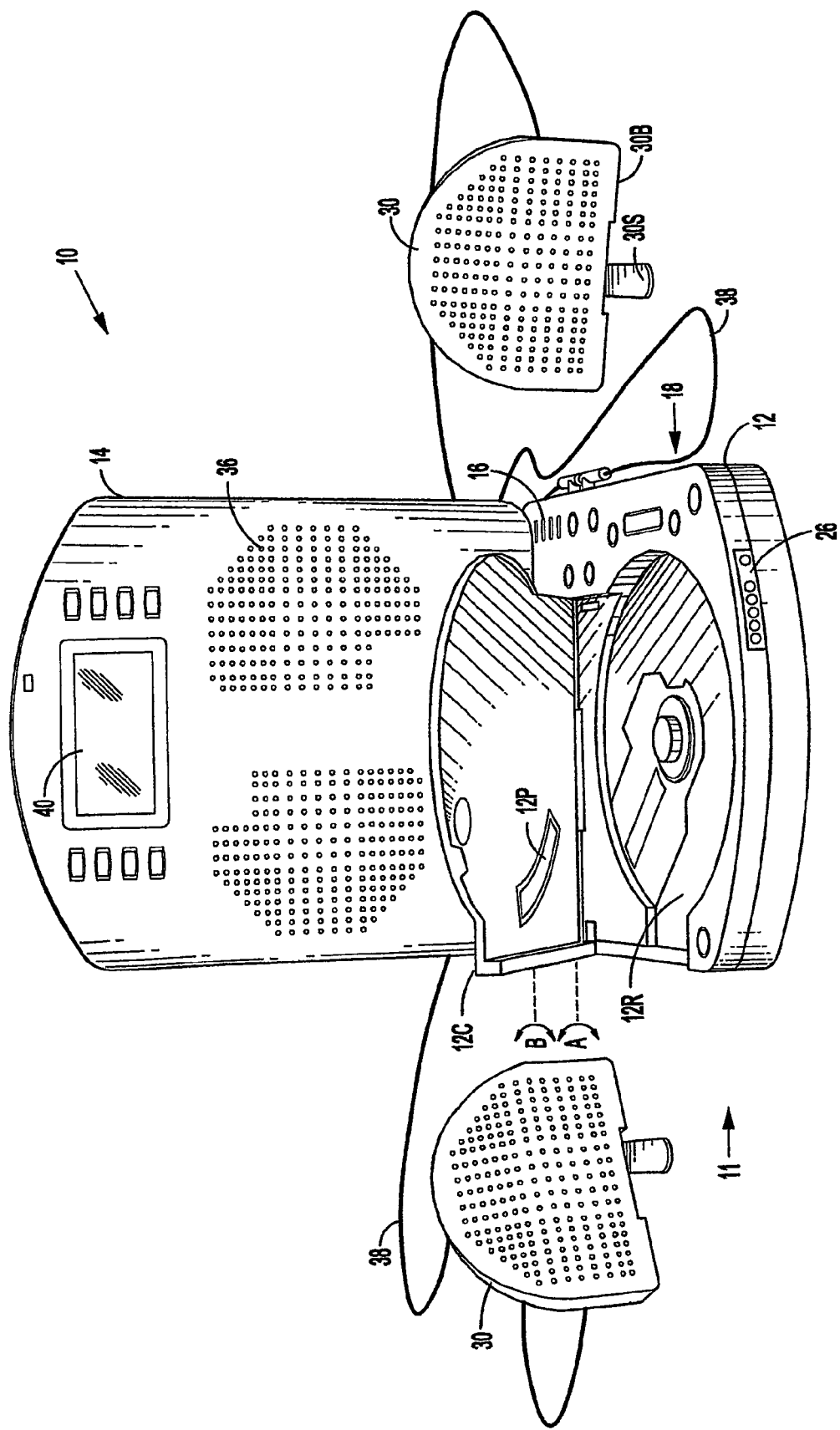
FIG. 2 is a front, perspective view of one embodiment of the present invention illustrating the receptacle cover in an open position.
Figure 3:
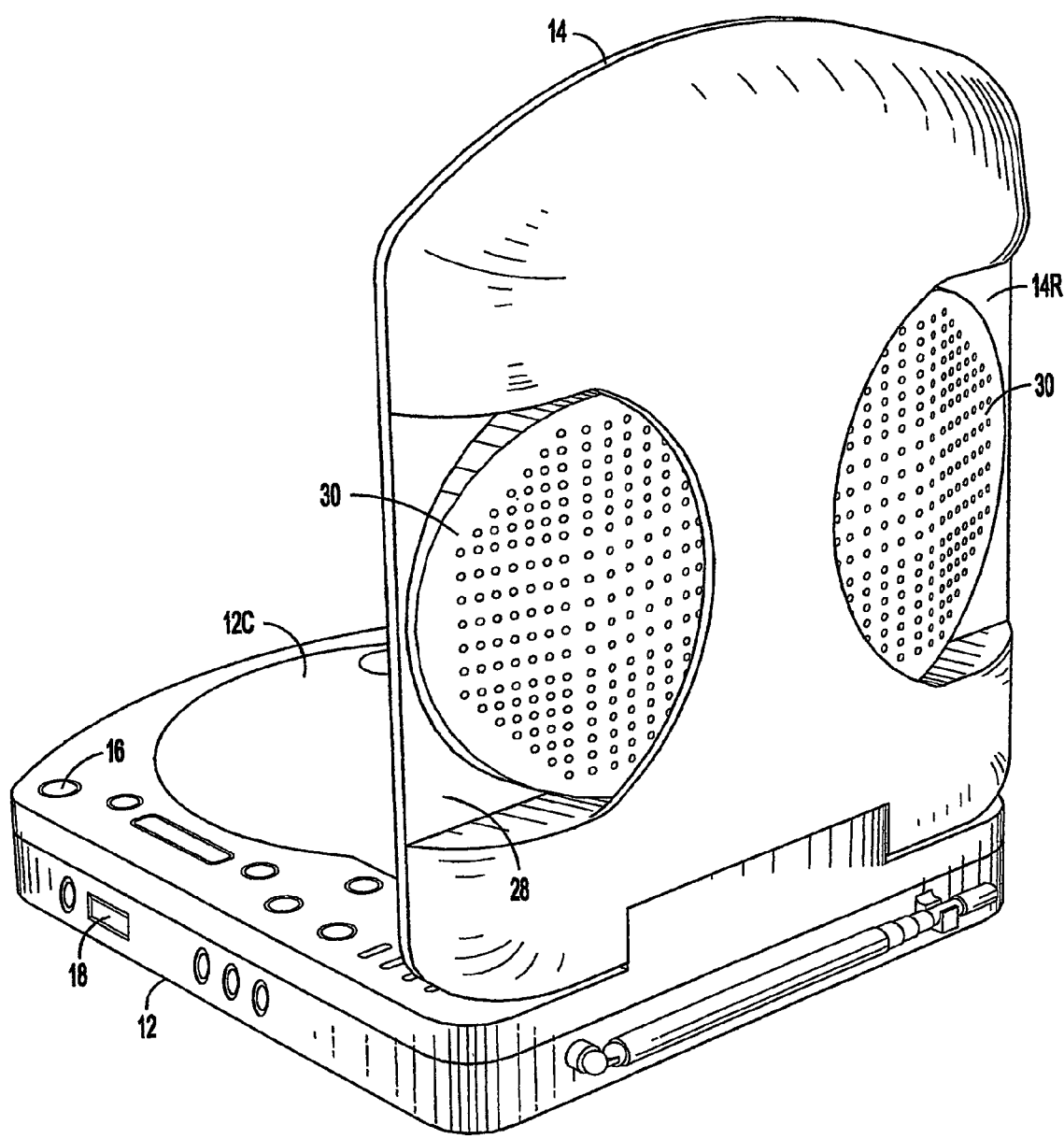
FIG. 3 is a rear, right side perspective view of one embodiment of the present invention illustrating speakers removably attached to speaker receptacles.
Figure 4:
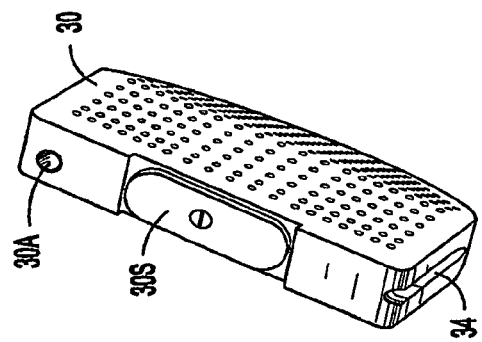
FIG. 4 is a left side, rear perspective view of the present invention illustrating the interplay between the speakers and receptacles in one embodiment.
Figure 4:
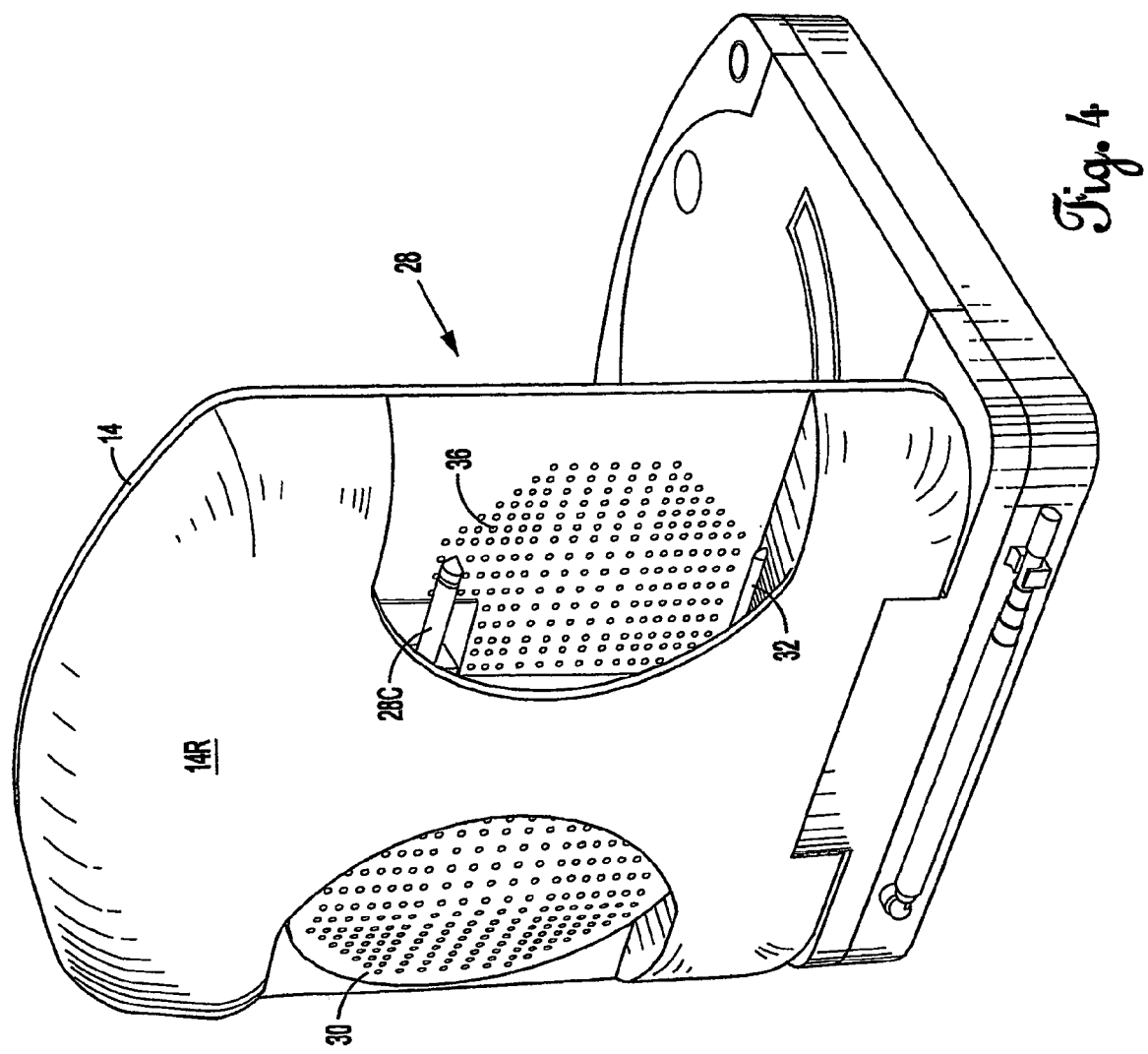

The present invention is herein described as a portable audio device comprising a housing (10), an audio player (11) within the housing for receiving and playing audio media, and at least one speaker (30) for outputting audio data to the user. In one embodiment, the present invention is equipped with a base member (12) and a cover member (14) rotatably attached thereto. In one embodiment, the base member (12) of the present invention has one or more media receptors (12R) capable of receiving one or more compact disks (not shown). A media cover (12C) capable of rotation about an axis of rotation (A) is provided to cover the media receptor (12R) during operation of the audio player of the present invention. In one embodiment, the media cover (12C) is equipped with a transparent viewing port (12P) to allow the user to view the compact disk (not shown) during operation of the audio player.

The present invention utilizes a plurality of buttons (16) and access ports (18). Each button and access port (16 and 18, respectively) is capable of providing the user with convenient control over the operation of the audio player of the present invention. The buttons could be located on the base member (12) or the cover member (14). The buttons could include controls for opening the media cover (12C); CD/MP3 operation such as stop, play/pause, fast forward or reverse, skip forward or reverse; tuner and tuner operation; mode/dir; EQ prog.; SAS/+10, ST/Mono; Presets; and snooze/light. The buttons could also include alarm mode, multiple alarms, alarm on/off, and sleep. The radio buttons could include world/local, set, up, and down. Additional controls for volume and bass boost could be included. Parts could include power supply, left and right speaker outlets, and headphone jack.

The audio player of the present invention provides a cover member (14) capable of rotation about an axis of rotation (B). In one embodiment, the cover member (14) is rotatably attached to a first end of the base member (12) such that the cover member (14) is rotatable between a closed position and an open position. Upon attaining a closed position, the cover member (14) acts as a protective cover for the base member (12). In one embodiment, a hook and latch arrangement (26) is provided to hold the cover member (14) in a closed position, when desired.

In one embodiment, the cover member (14) of the audio player of the present invention is equipped with one or more speaker receptacles (28) for receiving one or more audio speakers (30). The audio player (10) of the present invention provides one or more audio speakers (30) capable of engaging the speaker receptacles (28) of the cover member (14). In one embodiment, each speaker (30) is equipped with at least one audio port (30A) and at least one stand member (30S). In one embodiment, each speaker receptacle (28) is equipped with a connection member (28C) designed to engage the audio port (30A) of the speaker (30). Thus, the present invention is capable of transmitting sound to the user without the use of headphones while the speaker (30) is engaged within the speaker receptacle (28) of the cover member (14). In one embodiment, the audio player of the present invention utilizes two audio speakers (30) capable of releasably engaging two speaker receptacles (28) located upon the rear surface (14R) of the cover member (14). In one embodiment, the speaker receptacles (28) and the speakers (30) of the present invention are equipped with at least one channel (32) and groove (34) arrangement to facilitate the secure engagement of the speakers (30) to the speaker receptacle (28). In another embodiment, multiple channel/groove arrangements are utilized by the present invention.

In one embodiment, at least a portion of the cover member (14) of the present invention has a perforated surface (36). The perforated surface (36) allows sound produced by speakers (30) secured to the speaker receptacles (28) of the audio player to pass through the cover member (14). This feature of the present invention allows the user to experience rich sound quality regardless of his or her position relative to the audio player. In one embodiment, each audio speaker (30) utilized by the present invention is capable of transmitting sound in multiple directions, thus further enhancing the listening experience of the user.

In one embodiment, each speaker (30) of the present invention may be removed from the speaker receptacle (28) and used in a stand-alone mode. Specifically, each speaker (30) is equipped with a substantially flat surface (30B) which allows each speaker to "stand on its own" apart from the audio player. In one embodiment, each speaker (30) of the present invention has a generally C-shaped configuration and is equipped with a stand member (30S) capable of reducing instability of the speaker once positioned apart from the audio player.

Once removed from the speaker receptacle (28), the speaker (30) may be connected to the audio device via an audio cable (38). Thus, sound produced by the audio player of the present invention may be transmitted through the audio cable (38) for enjoyment by the user without the need for headphones. In one embodiment, two audio speakers (30) are utilized to provide the user with a "surround sound" listening experience. In this embodiment, each audio speaker (30) utilizes a separate audio cable (38) to transmit sound from the player to the speakers. In another embodiment of the present invention, sound is transmitted from the player to the speakers (30), without the use of audio cables. The audio player may transmit sound through the two audio speakers (30) while removably secured to the cover member (14) and simultaneously through additional speakers (not shown) connected to the audio player via the audio cable (38) resulting in more than two speakers providing rich stereo sound.

In one embodiment, the cover member (14) is equipped with a display screen (40) capable of displaying a plurality of graphical or textual information to the user. The audio device of the present invention may also be equipped with a clock having alarm functions for the convenience of the user, if desired.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. A portable audio device comprising:
   a housing comprising a base member and a cover member, said cover member being rotatably attached to said base member such that said cover member is capable of movement between an open position and a closed position said cover member having a face surface having at least two perforated portions and a back surface, said back surface having at least two speaker receptacles;
   an audio player within said housing for receiving and playing audio media; and
   at least two speakers for outputting audio data, said speakers being removably receivable within said at least two receptacles upon said back surface of said cover member, wherein each of said receptacles further comprises means for electrically connecting said speakers to said audio player; wherein said at least two perforated portions are located adjacent to said receptacles such that sound from said speakers may pass therethrough; and wherein said base member further comprises a media cover rotatably attached to said base member; said media cover being rotatable about an axis of rotation and moveable between open position and a closed position.

* * * * *